Patented Dec. 4, 1928.

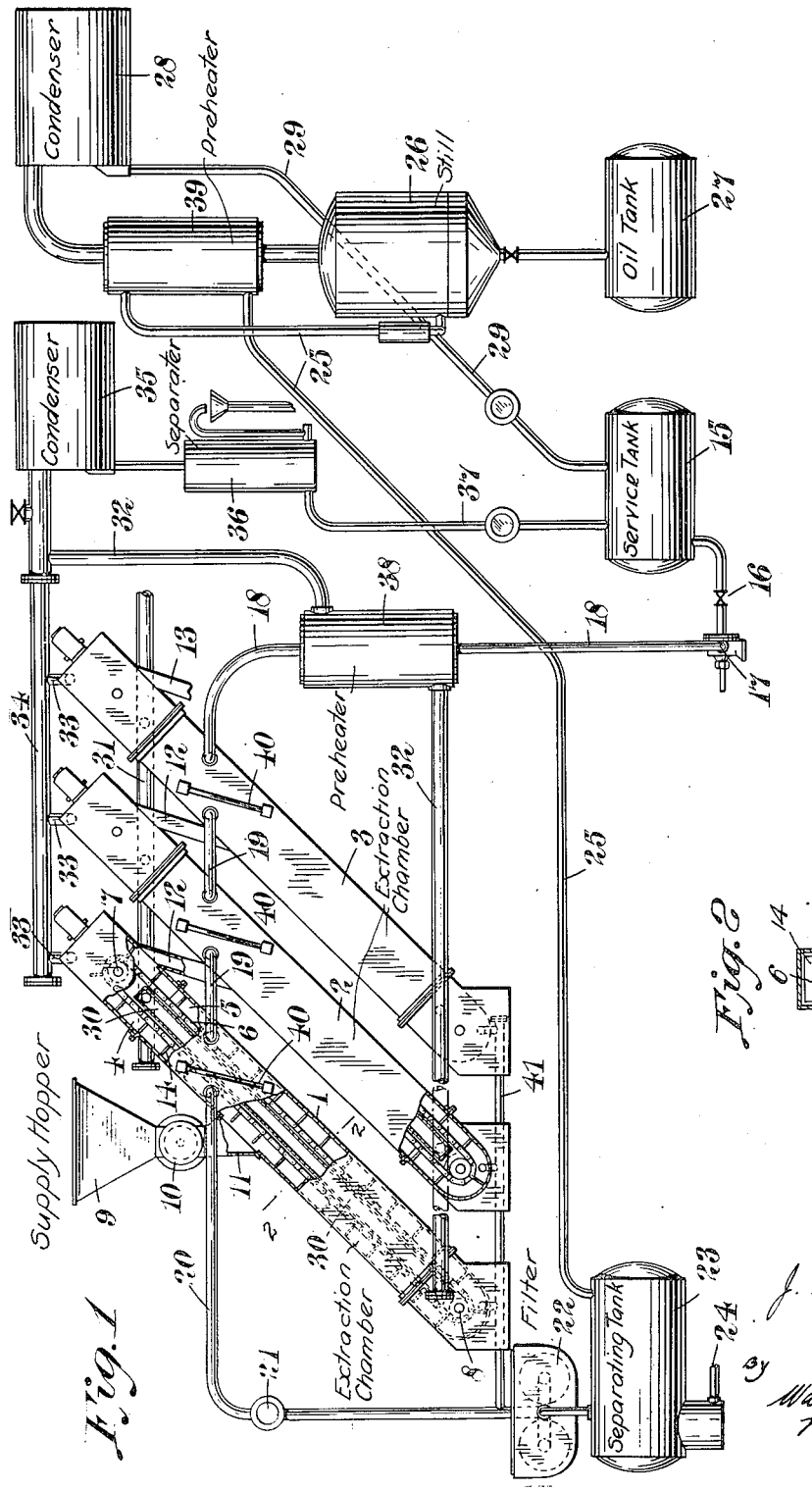

1,694,361

UNITED STATES PATENT OFFICE.

JOHN ROBERT STERLING, OF LONDON, ENGLAND.

APPARATUS FOR EXTRACTION OF WATER, OIL, AND FATTY MATTER FROM SOLID MATERIAL.

Application filed March 8, 1928, Serial No. 260,115, and in Great Britain November 8, 1926.

This invention relates to the extraction of water, oil and fatty matter from solid material particularly of an animal or vegetable nature (such as fish, offal, oil-bearing seeds and the like) and in certain cases to the production from such material of a dry meal suitable for example as a food for animals.

The invention is concerned with that type of extraction process in which the material to be treated is subjected to the action of a liquid extracting medium which is a solvent for the oil to be removed.

The present invention provides an improved apparatus for carrying out an extraction process of the above type, said apparatus comprising in combination an elongated extraction chamber subdivided into two parallel or substantially parallel compartments and arranged to receive a supply of the liquid-extracting medium, a conveyor of the endless band or chain type having its two runs arranged to traverse the aforesaid two compartments respectively, and means for supplying the material to be treated to one of the compartments aforesaid and for withdrawing the treated material from the other compartment.

A succession of elongated extraction chambers as described above may be employed, the chambers being arranged to communicate with one another in a manner which will hereinafter be described.

An example embodying the foregoing and other features of the invention will now be described with reference to the accompanying drawing in which Figure 1, shows in diagrammatic form, the various components of the apparatus, and Figure 2 is a cross section on the line 2—2 of Figure 1.

The apparatus comprises three elongated chambers 1, 2 and 3 arranged in succession and each extending from end to end in a direction slightly inclined to the vertical. Each extraction chamber is subdivided into two parallel compartments 4, 5, adjacent to the two sides of the chamber respectively and communicating with each other at the upper and lower end of said chamber. An endless chain conveyor 6 is mounted within each chamber so that one run of the conveyor traverses the compartment 4 and the other run traverses the compartment 5. The conveyor is mounted on chain sprockets 7 and 8 located at the upper and lower ends respectively of the extraction chamber. In each chamber the conveyor 6 is driven in a direction such that the descending run traverses the compartment 4 and the ascending run traverses the compartment 5. The material to be treated is supplied from a hopper 9, by way of a gas-tight valve 10 and inlet conduit 11, to the compartment 4 of the first extraction chamber 1. The material is conveyed down the compartment 4 to the lower end thereof and then up the compartment 5 to the top of the chamber. From thence the material is conducted, by way of a downwardly inclined communicating pipe 12 to the intake compartment 4 of the next chamber 2. The material is propelled through the second and third chambers in the same manner as before and is finally discharged through the conduit 13 which may be arranged to deliver to a drying plant of the kind described in British Patent No. 223,298.

Each conveyor 6 is provided with vanes 14 which control the rate at which the material gravitates down the compartment 4 and effect the elevation of the material in the compartment 5. At the lower end of each chamber the vanes turn over the material as it passes from one compartment to the other.

The extracting medium, i. e. a liquid solvent, is stored in a service tank 15. The solvent is supplied by way of a regulating valve 16, pump 17 and inlet conduit 18 to the compartment 5 of the last chamber 3 of the series. The solvent circulates round the chamber 3 and is passed by the communicating pipes 19 into and through the chambers 2 and 1 in succession. In this way the apparatus operates on the contra-flow principle, the solvent and the material to be treated therewith travelling in opposite directions through each chamber and throughout the series. The solvent is withdrawn from the chamber 1 by a conduit 20 (fitted with a sight glass 21) which delivers through filters 22 to a tank 23 in which water is separated from the saturated solvent and removed by the pipe 24.

The saturated solvent is passed from the tank 23 by a pipe 25 to a still 26 in which the solvent is evaporated leaving the oil or fatty matter extracted by the treatment. The oil is collected in a tank 27 and the solvent vapours are passed to a condenser 28 from which the condensate is returned through a conduit 29 to the service tank 15.

In order to assist the solvent in extracting the oil and water each extraction chamber is provided with a heating "jacket" 30 located between the two compartments 4 and 5. The apparatus may be worked in conjunction with a drying plant of the kind described in British Patent No. 223,298 in which case it is convenient to employ the heating medium (usually steam) when exhausted from the drying plant for supplying the extraction chamber jackets 30. The heating medium is supplied to the top of the jackets by a pipe 31 (leading from the drying plant) and withdrawn at the bottom of the jackets by a pipe 32.

Where the extraction chambers are heated a certain proportion of the solvent may be evaporated, and this vapour is withdrawn from the top of each chamber through outlets 33 which communicate with a manifold conduit 34 leading to a condenser 35. The exhaust steam from the heating jackets 30 is also passed (by the conduit 32) into the condenser 35. The condensate from the condenser 35 is passed to a separator 36 in which the water is separated from the solvent and the latter returned (through a pipe 37) to the service tank 15.

In order to increase the thermal efficiency of the plant pre-heaters 38 and 39 are employed. The conduit 18 through which the solvent is supplied to the extraction chambers, traverses the preheater 38 which is heated by the exhaust steam from the chamber jackets 30 on its way to the condenser 35. The saturated solvent on its way from the tank 23 to the still 26 is passed through the preheater 39, which is heated by the vapour passing from the still to the condenser 28.

The level of the solvent in each extraction chamber is indicated by sight glasses 40 and is normally maintained below the level at which the material passes out of each chamber and into the next. A drain pipe 41 leading to the filters 22 communicates with the lower end of each extraction chamber and removes any water which may collect there together of course with a certain proportion of the solvent.

As the material progresses through the various chambers of the series its bulk decreases and by the provision of independent conveyors in each chamber the speed of each conveyor may be regulated to a value appropriate to the volume of material to be passed through each chamber.

The apparatus described above and the method of operating it may be modified to suit the requirements of the particular material which is being treated. If desired there may be a separate supply of solvent for each chamber so that the solvent passing through and out of one chamber is maintained separate from that passing through and out of the adjacent chambers. With such an arrangement the chambers may be grouped so far as the separation of the water and oil from the solvent is concerned. For example if the material undergoing treatment contains much water in addition to oil or fatty matter the solvent removed in the first chamber or chambers will carry off the water content, or a substantial proportion of it, but will extract substantially no oil. In such a case the solvent removed from the first two chambers may be treated together say by decanting while the solvent withdrawn from subsequent chambers is treated say by evaporation.

I claim:

Apparatus for carrying out an extraction process of the type described comprising in combination a series of elongated extraction chambers each subdivided into substantially parallel compartments, a plurality of endless conveyors located respectively within the aforesaid extraction chambers and having the two runs of each conveyor arranged to traverse the two compartments aforesaid of each extraction chamber, means to supply the material to be treated to the first chamber of the series, means communicating between the chambers for the conveyance of the material from chamber to chamber throughout the series, means for supplying each chamber with a liquid-extracting medium, a plurality of heating jackets associated respectively with the several extraction chambers, means for conveying a gaseous heating medium through the jackets aforesaid, a preheater for the liquid extracting medium, and means for supplying the exhaust heating medium from the jackets aforesaid to said preheater.

In testimony whereof I affix my signature.

JOHN ROBERT STERLING.